US012608196B2

(12) United States Patent
Poosapalli et al.

(10) Patent No.: US 12,608,196 B2

(45) Date of Patent: Apr. 21, 2026

(54) DIAGNOSTICS AND REMEDIATION FOR A SPLIT-BOOT ARCHITECTURE

(71) Applicant: Dell Products, L.P., Round Rock, TX (US)

(72) Inventors: Karunakar Poosapalli, Bangalore (IN); Shekar Babu Suryanarayana, Bangalore (IN); Ibrahim Sayyed, Georgetown, TX (US)

(73) Assignee: Dell Products, L.P., Round Rock, TX (US)

( * ) Notice: Subject to any disclaimer, the term of this patent is extended or adjusted under 35 U.S.C. 154(b) by 267 days.

(21) Appl. No.: 18/446,038

(22) Filed: Aug. 8, 2023

(65) Prior Publication Data

US 2025/0053415 A1     Feb. 13, 2025

(51) Int. Cl.
*G06F 9/4401*          (2018.01)
*G06F 8/71*            (2018.01)

(52) U.S. Cl.
CPC .............. *G06F 8/71* (2013.01); *G06F 9/4401* (2013.01)

(58) Field of Classification Search
None
See application file for complete search history.

(56) References Cited

U.S. PATENT DOCUMENTS

| | | | | |
|---|---|---|---|---|
| 12,079,612 | B2 * | 9/2024 | Banik | ................... G06F 9/4843 |
| 2013/0305025 | A1 * | 11/2013 | Tsirkin | ................ G06F 9/45558 |
| | | | | 713/2 |
| 2015/0169331 | A1 * | 6/2015 | Nelogal | ................... G06F 9/441 |
| | | | | 710/108 |
| 2018/0101377 | A1 * | 4/2018 | Wingate, Jr. | ............ G06F 8/654 |
| 2018/0285126 | A1 * | 10/2018 | Ganesan | ............... G06F 9/4401 |
| 2022/0216984 | A1 * | 7/2022 | Liu | ....................... H04L 9/0894 |

OTHER PUBLICATIONS

Karunakar Poosapalli, et al., "Telemetry Driven Platform Restoration for a Split Boot Architecture," United States U.S. Appl. No. 18/335,543, filed Jun. 15, 2023.
Marvin Fuchs, et al., "Split Boot—True Network-Based Booting on Heterogeneous MPSoCs," IEEE Transactions on Nuclear Science, arXiv:2301.05642v2, Jan. 25, 2023, pp. 1-7.

* cited by examiner

*Primary Examiner* — Fahmida Rahman

(74) *Attorney, Agent, or Firm* — Fogarty LLP

(57)          ABSTRACT

Systems and methods for diagnostics and remediation for a split-boot architecture are described. In an illustrative, non-limiting embodiment, an Information Handling System (IHS) may include: a printed circuit board; a processor coupled to the printed circuit board; and a memory coupled to the processor, wherein the memory comprises program instructions stored thereon that, upon execution by the processor, cause the IHS to: send, in a split boot architecture, one or more commands from executed firmware onboard the printed circuit board to executed extended firmware via a communication protocol; and based, at least in part, on a response or a lack of response from the executed extended firmware to the one or more commands, perform one or more responsive actions.

13 Claims, 5 Drawing Sheets

PARALLEL PROCESS WITH SPLIT
ONBOARD SPI FW AND
EXTENDED NVMe FW DRIVERS

FIG. 2

DIAGNOSTICS AND REMEDIATION FOR A SPLIT-BOOT ARCHITECTURE

FIELD

This disclosure relates generally to Information Handling Systems (IHSs), and more specifically, to systems and methods for diagnostics and remediation for a split-boot architecture.

BACKGROUND

As the value and use of information continues to increase, individuals and businesses seek additional ways to process and store it. One option available to users is an Information Handling System (IHS). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated.

Variations in IHSs allow for IHSs to be general or configured for a specific user or specific use, such as financial transaction processing, airline reservations, enterprise data storage, or global communications. In addition, IHSs may include a variety of hardware and software components that may be configured to process, store, and communicate information and may include one or more computer systems, data storage systems, and networking systems.

The term "boot" is used to describe a start-up process when power is applied to a device. A processing system has a boot process that describes a configuration sequence to start up a processing system at power-on. The most common boot techniques require the processor to wake up first, initialize itself and then initialize the rest of the system as part of a pre-determined boot sequence. Once the processor wakes up, the processor sets up initial values in the I/O and memory control registers—before access to memory or I/O can begin. The start sequence usually starts with the processor sensing some boot configuration pins during a power-on-reset to select one of the supported boot methods. In most systems, the processor boot configuration pins are hard wired to power or ground to indicate the boot method. Once the boot method is chosen, the processor will look for its initial set of configuration parameters on a pre-defined set of pins or a signal bus. In all these known techniques, the low-level initial configuration values and initial boot parameters that set up the processor in the initial stages of power-on do not get validated for conformance to security rules—a key concern for secure systems.

SUMMARY

Systems and methods for diagnostics and remediation for a split-boot architecture are described. In an illustrative, non-limiting embodiment, an IHS may include a printed circuit board; a processor coupled to the printed circuit board; and a memory coupled to the processor, where the memory includes program instructions stored thereon that, upon execution by the processor, cause the IHS to: obtain, in a split boot architecture, telemetry data from firmware onboard the printed circuit board, and from extended firmware; and detect one or more boot failure events using the obtained telemetry data.

In some embodiments, the split boot architecture includes firmware code split into the firmware onboard the printed circuit board and the extended firmware, where the firmware onboard the printed circuit resides on a Serial Peripheral Interface ("SPI") component, and where the extended firmware resides on a Non-Volatile Memory Express ("NVMe") component. In some embodiments, the firmware onboard the printed circuit board and the extended firmware include respective persistent storage spaces for telemetry, and where, during boot, both the firmware onboard the printed circuit board and the extended firmware log telemetry data in the respective persistent storage spaces for telemetry. In some embodiments, the program instructions, upon execution by the processor, cause a machine learning algorithm to detect the one or more boot failure events using the obtained telemetry data.

In some embodiments, the program instructions, upon execution by the processor, cause the IHS to obtain the telemetry data in response to a failure of the extended firmware. In some of these embodiments, to detect the one or more boot failure events using the obtained telemetry data, the program instructions cause the IHS to: determine a stage at which the failure of the extended firmware occurred. In some embodiments, the program instructions cause the IHS to: revert the extended firmware to a last good known configuration. In some of these embodiments, the last good known configuration includes one or more of: a factory default configuration, or a previous configuration that was captured when the IHS had a successful boot. In some embodiments, the last good known configuration is obtained from a cloud service via a network.

In some embodiments, to detect the one or more boot failure events using the obtained telemetry data, the program instructions cause the IHS to: determine configuration changes that occurred in previous boot cycles.

In another illustrative, non-limiting embodiment, one or more non-transitory computer-readable storage media store program instructions, that when executed on or across one or more processors of a circuit board in an IHS, cause the IHS to: obtain, in a split boot architecture, telemetry data from firmware onboard the circuit board, and from extended firmware; and detect one or more boot failure events using the obtained telemetry data.

In some embodiments, both the firmware onboard the circuit board and the extended firmware include respective persistent storage spaces for telemetry, where, during boot, both the firmware onboard the printed circuit board and the extended firmware log telemetry data in the respective persistent storage spaces for telemetry. In some embodiments, the program instructions further cause a machine learning algorithm to detect the one or more boot failure events using the obtained telemetry data.

In some embodiments, the program instructions further cause the IHS to: obtain the telemetry data from the firmware onboard the circuit board, and from the extended firmware, in response to a failure of the extended firmware. In some of these embodiments, the program instructions further cause the IHS to: revert the extended firmware to a last good known configuration.

In another illustrative, non-limiting embodiment, a method, includes: obtaining first telemetry data associated with a first firmware executed, during a boot process, by a first hardware component of an IHS; obtaining second telemetry data associated with a second firmware executed, during the boot process, by a same or different hardware component of the IHS; and detecting a boot failure event using the first and second telemetry data.

In some embodiments, both the first firmware and the second firmware are associated with respective persistent storage spaces for telemetry, and during the boot process, the method further includes: logging, by both the first firmware and the second firmware, telemetry data into the respective persistent storage spaces for telemetry. In some embodiments, the detecting the boot failure event using the first and second telemetry data is performed by a machine learning algorithm.

In some embodiments, the obtaining the first telemetry data and the obtaining the second telemetry data are performed in response to a failure of at least the second firmware. In some of these embodiments, the method further includes: reverting the second firmware to a last good known configuration.

In another illustrative, non-limiting embodiment, an IHS can include: a printed circuit board; a processor coupled to the printed circuit board; and a memory coupled to the processor, where the memory includes program instructions stored thereon that, upon execution by the processor, cause the IHS to: send, in a split boot architecture, one or more commands from executed firmware onboard the printed circuit board to executed extended firmware via a communication protocol; and based, at least in part, on a response or a lack of response from the executed extended firmware to the one or more commands, perform one or more responsive actions.

In some embodiments, the split boot architecture includes firmware code split into the firmware onboard the printed circuit board and the extended firmware, where the firmware onboard the printed circuit board resides on a Serial Peripheral Interface ("SPI") component, and where the extended firmware resides on a Non-Volatile Memory Express ("NVMe") component In some embodiments, the one or more commands include a self-test command from the firmware onboard the printed circuit board to the extended firmware. In some of these embodiments, the self-test command instructs the extended firmware to check a health status of a Non-Volatile Memory Express ("NVMe") component including the extended firmware.

In some embodiments, to perform the one or more responsive actions, the program instructions, upon execution by the processor, further cause the IHS to: revert the extended firmware to a last good known configuration. In some of these embodiments, the last good known configuration includes one or more of: a factory default configuration, or a previous configuration that was captured when the IHS had a successful boot. In others of these embodiments, the last good known configuration is obtained from a cloud service via a network.

In some embodiments, the one or more responsive actions include one or more of: re-flash the extended firmware with a last good known image when no response is received from the extended firmware; record errors and provide error information to a server of an original equipment manufacturer when the response from the extended firmware indicates bad sectors; perform a reset of the extended firmware when the response from the extended firmware indicates normal operation; or re-scan the component including the extended firmware when the response from the extended firmware indicates normal operation.

In some embodiments, the program instructions, upon execution by the processor, further cause the IHS to: log information into a common memory space shared between the firmware onboard the printed circuit board and the extended firmware. In some embodiments, the communication protocol is for communication between the firmware onboard the printed circuit board and the extended firmware. In some embodiments, the one or more commands are sent by the firmware onboard the printed circuit board in response to a determination that no bootable devices are found.

In some embodiments, the communication protocol is for communication between the firmware onboard the printed circuit board and the extended firmware, where the communication protocol allows at least the firmware onboard the printed circuit board to perform one or more of the following: (a) verify a system initialization handoff; (b) reserve random-access memory (RAM) for a common datastore; (c) retrieve event data associated with the firmware onboard the printed circuit board from the common datastore; or (d) retrieve event data associated with the extended firmware from the common datastore.

In another illustrative, non-limiting embodiment, one or more non-transitory computer-readable storage media store program instructions, that when executed on or across one or more processors of a circuit board in an IHS, causes firmware onboard the circuit board of the IHS to: send, in a split boot architecture, one or more commands to extended firmware; and based, at least in part, on a response or a lack of response from the extended firmware to the one or more commands, perform one or more responsive actions.

In some embodiments, the one or more commands include a self-test command from the firmware onboard the circuit board to the extended firmware, instructing the extended firmware to check a health status of a Non-Volatile Memory Express ("NVMe") component including the extended firmware.

In some embodiments, to perform the one or more responsive actions, the program instructions further cause the firmware onboard the circuit board of the IHS to: re-flash the extended firmware with a last good known image when no response is received from the extended firmware; record errors and provide error information to a server of an original equipment manufacturer when the response from the extended firmware indicates bad sectors; perform a reset of the extended firmware when the response from the extended firmware indicates normal operation; or re-scan the component including the extended firmware when the response from the extended firmware indicates normal operation.

In some embodiments, the program instructions further cause the firmware onboard the circuit board of the IHS to: log information into a common memory space shared between the firmware onboard the printed circuit board and the extended firmware.

In another illustrative, non-limiting embodiment, a method can include: sending, in a split boot architecture, one or more commands from executing firmware onboard a printed circuit board to executing extended firmware; and based, at least in part, on a response or a lack of response from the extended firmware to the one or more commands, performing one or more responsive actions.

In some embodiments, sending the one or more commands from the executing firmware onboard a printed circuit board to the executing extended firmware further includes: sending a self-test command to the executing extended firmware.

In some embodiments, the performing of the one or more responsive actions further includes performing one or more of the following: re-flashing the extended firmware with a last good known image when no response is received from the extended firmware; recording errors and providing error information to a server of an original equipment manufacturer when the response from the extended firmware indicates bad sectors; performing a reset of the extended firmware when the response from the extended firmware indicates normal operation; or re-scanning the component including the extended firmware when the response from the extended firmware indicates normal operation. In some embodiments, the method further includes: logging information into a common memory space shared between the firmware onboard the printed circuit board and the extended firmware.

In another illustrative, non-limiting embodiment, an IHS can include: a printed circuit board; a processor coupled to the printed circuit board; and a memory coupled to the processor, where the memory includes program instructions stored thereon that, upon execution by the processor, cause the IHS to: obtain one or more cryptographic keys associated with firmware onboard the printed circuit board; and verify extended firmware using the cryptographic keys.

In some embodiments, the IHS includes a split boot architecture including firmware code split into the firmware onboard the printed circuit board and the extended firmware, where the firmware onboard the printed circuit board resides on a Serial Peripheral Interface ("SPI") component, and where the extended firmware resides on a Non-Volatile Memory Express ("NVMe") component. In some embodiments, to obtain the one or more cryptographic keys associated with the firmware onboard the printed circuit board, the program instructions, upon execution by the processor, further cause the IHS to: generate the one or more cryptographic keys based, at least in part, on an identification of the processor.

In some embodiments, the program instructions, upon execution by the processor, further cause the IHS to: extract event logs from a dead platform using the one or more cryptographic keys. In some embodiments, the program instructions, upon execution by the processor, further cause the IHS to: launch a network stack with either a universal network driver interface (UNDI), or a Simple Network Protocol (SNP) protocol, or both, to connect with a remote server; and provide the extracted event logs to the remote server using the network stack.

In some embodiments, to verify the extended firmware using the cryptographic keys, the program instructions, upon execution by the processor, further cause the IHS to: verify a signature of content extracted from a feature set of the extended firmware. In some embodiments, one or more cryptographic keys include a drive attestation signature of a drive associated with the extended firmware. In some embodiments, to verify the extended firmware using the cryptographic keys, the program instructions, upon execution by the processor, further cause the IHS to: obtain attributes of the drive associated with the extended firmware; compare information derived from the attributes to the drive attestation signature; and validate the drive associated with the extended firmware based, at least in part, on the comparison. In some embodiments, the attributes of the drive associated with the extended firmware include an electronic Piece Part Identification (ePPID).

In some embodiments, to verify the extended firmware using the cryptographic keys, the program instructions, upon execution by the processor, further cause the IHS to: obtain attributes of a drive associated with the extended firmware; compare information derived from the attributes to the one or more cryptographic keys; fail to validate the drive associated with the extended firmware based, at least in part, on the comparison; and provide an error message to a user or administrator.

In another illustrative, non-limiting embodiment, a method can include: obtaining one or more cryptographic keys associated with firmware onboard a printed circuit board; and verifying, in a split boot architecture, extended firmware using the cryptographic keys.

In some embodiments, obtaining the one or more cryptographic keys associated with the firmware onboard the printed circuit board, further includes: generating the one or more cryptographic keys based, at least in part, on an identification of the processor. In some embodiments, verifying the extended firmware using the cryptographic keys further includes: verifying a signature of content extracted from a feature set of the extended firmware.

In some embodiments, the one or more cryptographic keys include a drive attestation signature of a drive associated with the extended firmware, where verifying the extended firmware using the cryptographic keys further includes: obtaining attributes of the drive associated with the extended firmware; comparing information derived from the attributes to the drive attestation signature; and validating the drive associated with the extended firmware based, at least in part, on the comparison.

In some embodiments, verifying the extended firmware using the cryptographic keys further includes: obtaining attributes of a drive associated with the extended firmware; comparing information derived from the attributes to the one or more cryptographic keys; failing to validate the drive associated with the extended firmware based, at least in part, on the comparison; and providing an error message to a user or administrator.

In another illustrative, non-limiting embodiment, one or more non-transitory computer-readable storage media store program instructions, that when executed on or across one or more processors of a circuit board in an IHS, cause the IHS to: obtain one or more cryptographic keys associated with firmware onboard the circuit board; and verify, in a split boot architecture, extended firmware using the cryptographic keys.

In some embodiments, to obtain the one or more cryptographic keys associated with the firmware onboard the printed circuit board, the program instructions further cause the IHS to: generate the one or more cryptographic keys based, at least in part, on an identification of the processor. In some embodiments, to verify the extended firmware using the cryptographic keys, the program instructions further cause the IHS to: verify a signature of content extracted from a feature set of the extended firmware.

In some embodiments, the one or more cryptographic keys include a drive attestation signature of a drive associated with the extended firmware, where to verify the extended firmware using the cryptographic keys, the program instructions further cause the IHS to: obtain attributes of the drive associated with the extended firmware; compare information derived from the attributes to the drive attestation signature; and validate the drive associated with the extended firmware based, at least in part, on the comparison.

In some embodiments, to verify the extended firmware using the cryptographic keys, the program instructions further cause the IHS to: obtain attributes of a drive associated with the extended firmware; compare information derived from the attributes to the one or more cryptographic keys; fail to validate the drive associated with the extended firmware based, at least in part, on the comparison; and provide an error message to a user or administrator.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

FIG. 2 is an architecture diagram illustrating an example of a split boot architecture, according to some embodiments.

DETAILED DESCRIPTION

For purposes of this disclosure, an Information Handling System (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price.

An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components.

Figure 1:
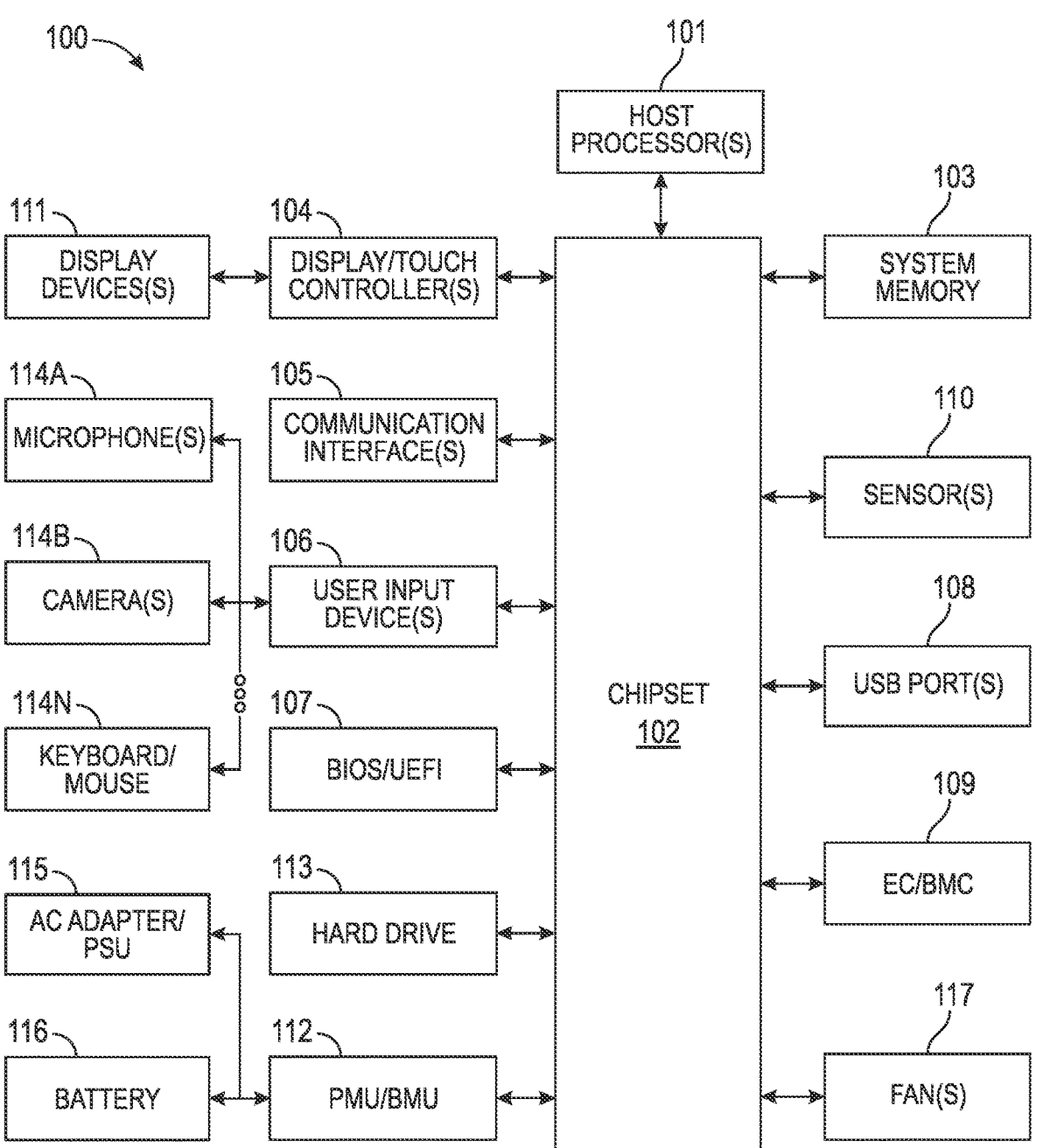
FIG. 1 is a diagram illustrating examples of hardware components of an Information Handling System (IHS), according to some embodiments.

FIG. 1 is a block diagram of hardware components of IHS 100, which may be used to implement diagnostics and remediation for a split-boot architecture.

As depicted, IHS 100 includes host processor(s) 101. In various embodiments, IHS 100 may be a single-processor system, or a multi-processor system including two or more processors. Host processor(s) 101 may include any processor capable of executing program instructions, such as a PENTIUM processor, or any general-purpose or embedded processor implementing any of a variety of Instruction Set Architectures (ISAs), such as an x86 or a Reduced Instruction Set Computer (RISC) ISA (e.g., POWERPC, ARM, SPARC, MIPS, etc.).

IHS 100 includes chipset 102 coupled to host processor(s) 101. Chipset 102 may provide host processor(s) 101 with access to several resources. In some cases, chipset 102 may utilize a QuickPath Interconnect (QPI) bus to communicate with host processor(s) 101.

Chipset 102 may also be coupled to communication interface(s) 105 to enable communications between IHS 100 and various wired and/or wireless networks, such as Ethernet, WiFi, BLUETOOTH (BT), cellular or mobile networks (e.g., Code-Division Multiple Access or "CDMA." Time-Division Multiple Access or "TDMA," Long-Term Evolution or "LTE," etc.), satellite networks, or the like. Communication interface(s) 105 may also be used to communicate with certain peripherals devices (e.g., BT speakers, microphones, headsets, etc.). Moreover, communication interface(s) 105 may be coupled to chipset 102 via a Peripheral Component Interconnect Express (PCIe) bus, or the like.

Chipset 102 may be coupled to display/touch controller(s) 104, which may include one or more or Graphics Processor Units (GPUs) on a graphics bus, such as an Accelerated Graphics Port (AGP) or PCIe bus. As shown, display/touch controller(s) 104 provide video or display signals to one or more display device(s) 111.

Display device(s) 111 may include Liquid Crystal Display (LCD), Light Emitting Diode (LED), organic LED (OLED), or other thin film display technologies. Display device(s) 111 may include a plurality of pixels arranged in a matrix, configured to display visual information, such as text, two-dimensional images, video, three-dimensional images, etc. In some cases, display device(s) 111 may be provided as a single continuous display, or as two or more discrete displays.

Chipset 102 may provide host processor(s) 101 and/or display/touch controller(s) 104 with access to system memory 103. In various embodiments, system memory 103 may be implemented using any suitable memory technology, such as static RAM (SRAM), dynamic RAM (DRAM) or magnetic disks, or any nonvolatile/Flash-type memory, such as a solid-state drive (SSD) or the like.

Chipset 102 may also provide host processor(s) 101 with access to one or more Universal Serial Bus (USB) ports 108, to which one or more peripheral devices may be coupled (e.g., integrated or external webcams, microphones, speakers, etc.).

Chipset 102 may further provide host processor(s) 101 with access to one or more hard disk drives, solid-state drives, optical drives, or other removable-media drives 113.

Chipset 102 may also provide access to one or more user input devices 106, for example, using a super I/O controller or the like. Examples of user input devices 106 include, but are not limited to, microphone(s) 114A, camera(s) 114B, and keyboard/mouse 114N. Other user input devices 106 may include a touchpad, stylus or active pen, totem, etc.

Each of user input devices 106 may include a respective controller (e.g., a touchpad may have its own touchpad controller) that interfaces with chipset 102 through a wired or wireless connection (e.g., via communication interfaces(s) 105). In some cases, chipset 102 may also provide access to one or more user output devices (e.g., video projectors, paper printers, 3D printers, loudspeakers, audio headsets, Virtual/Augmented Reality (VR/AR) devices, etc.)

In certain embodiments, chipset 102 may further provide an interface for communications with hardware sensors 110.

Sensors 110 may be disposed on or within the chassis of IHS 100, or otherwise coupled to IHS 100, and may include, but are not limited to: electric, magnetic, radio, optical (e.g., camera, webcam, etc.), infrared, thermal (e.g., thermistors etc.), force, pressure, acoustic (e.g., microphone), ultrasonic, proximity, position, deformation, bending, direction, movement, velocity, rotation, gyroscope, Inertial Measurement Unit (IMU), and/or acceleration sensor(s).

Upon booting of IHS 100, host processor(s) 101 may utilize program instructions of Basic Input/Output System (BIOS) 107 to initialize and test hardware components coupled to IHS 100 and to load host OS for use by IHS 100.

BIOS 107 provides an abstraction layer that allows host OS to interface with certain IHS components 100. Relying upon the hardware abstraction layer provided by BIOS 107, software stored in system memory 103 and executed by host processor(s) 101 can interface with certain I/O devices that are coupled to IHS 100.

The Unified Extensible Firmware Interface (UEFI) was designed as a successor to BIOS. As a result, many modern IHSs utilize UEFI in addition to or instead of a BIOS. As used herein, BIOS 107 is intended to also encompass a UEFI component.

Embedded Controller (EC) or Baseboard Management Controller (BMC) 109 is operational from the very start of each IHS power reset and handles various tasks not ordinarily handled by host processor(s) 101. Examples of these operations may include, but are not limited to: receiving and processing signals from a keyboard or touchpad, as well as other buttons and switches (e.g., power button, laptop lid switch, etc.), receiving and processing thermal measurements (e.g., performing fan control, CPU and GPU throttling, and emergency shutdown), controlling indicator LEDs (e.g., caps lock, scroll lock, num lock, battery, ac, power, wireless LAN, sleep, etc.), managing PMU/BMU 112, alternating current (AC) adapter/Power Supply Unit (PSU) 115 and/or battery 116, allowing remote diagnostics and remediation over network(s) 103, etc.

For example, EC/BMC 109 may implement operations for interfacing with power adapter/PSU 115 in managing power for IHS 100. Such operations may be performed to determine the power status of IHS 100, such as whether IHS 100 is operating from AC adapter/PSU 115 and/or battery 116.

Firmware ("FW") instructions utilized by EC/BMC 109 may also be used to provide various core operations of IHS 100, such as power management and management of certain modes of IHS 100 (e.g., turbo modes, maximum operating clock frequencies of certain components, etc.).

In addition, EC/BMC 109 may implement operations for detecting certain changes to the physical configuration or posture of IHS 100. For instance, when IHS 100 as a 2-in-1 laptop/tablet form factor, EC/BMC 109 may receive inputs from a lid position or hinge angle sensor 110, and it may use those inputs to determine: whether the two sides of IHS 100 have been latched together to a closed position or a tablet position, the magnitude of a hinge or lid angle, etc. In response to these changes, the EC may enable or disable certain features of IHS 100 (e.g., front or rear facing camera, etc.).

In some cases, EC/BMC 109 may be configured to identify any number of IHS postures, including, but not limited to: laptop, stand, tablet, tent, or book. For example, when display(s) 111 of IHS 100 is open with respect to a horizontal keyboard portion, and the keyboard is facing up, EC/BMC 109 may determine IHS 100 to be in a laptop posture. When display(s) 111 of IHS 100 is open with respect to the horizontal keyboard portion, but the keyboard is facing down (e.g., its keys are against the top surface of a table), EC/BMC 109 may determine IHS 100 to be in a stand posture.

When the back of display(s) 111 is closed against the back of the keyboard portion, EC/BMC 109 may determine IHS 100 to be in a tablet posture. When IHS 100 has two display(s) 111 open side-by-side, EC/BMC 109 may determine IHS 100 to be in a book posture. When IHS 100 has two displays open to form a triangular structure sitting on a horizontal surface, such that a hinge between the displays is at the top vertex of the triangle, EC/BMC 109 may determine IHS 100 to be in a tent posture. In some implementations, EC/BMC 109 may also determine if display(s) 111 of IHS 100 are in a landscape or portrait orientation.

In some cases, EC/BMC 109 may be installed as a Trusted Execution Environment (TEE) component to the motherboard of IHS 100.

Additionally, or alternatively, EC/BMC 109 may be configured to calculate hashes or signatures that uniquely identify individual components of IHS 100. In such scenarios, EC/BMC 109 may calculate a hash value based on the configuration of a hardware and/or software component coupled to IHS 100. For instance, EC/BMC 109 may calculate a hash value based on all firmware and other code or settings stored in an onboard memory of a hardware component.

Hash values may be calculated as part of a trusted process of manufacturing IHS 100 and may be maintained in secure storage as a reference signature. EC/BMC 109 may later recalculate the hash value for a component may compare it against the reference hash value to determine if any modifications have been made to the component, thus indicating that the component has been compromised. In this manner, EC/BMC 109 may validate the integrity of hardware and software components installed in IHS 100.

In various embodiments, IHS 100 may be coupled to an external power source (e.g., AC outlet or mains) through AC adapter/PSU 115. AC adapter/PSU 115 may include an adapter portion having a central unit (e.g., a power brick, wall charger, or the like) configured to draw power from an AC outlet via a first electrical cord, convert the AC power to direct current (DC) power, and provide DC power to IHS 100 via a second electrical cord.

Additionally, or alternatively, AC adapter/PSU 115 may include an internal or external power supply portion (e.g., a switching power supply, etc.) connected to the second electrical cord and configured to convert AC to DC. AC adapter/PSU 115 may also supply a standby voltage, so that most of IHS 100 can be powered off after preparing for hibernation or shutdown, and powered back on by an event (e.g., remotely via wake-on-LAN, etc.). In general, AC adapter/PSU 115 may have any specific power rating, measured in volts or watts, and any suitable connectors.

IHS 100 may also include internal or external battery 116. Battery 116 may include, for example, a Lithium-ion or Li-ion rechargeable device capable of storing energy sufficient to power IHS 100 for an amount of time, depending upon the IHS's workloads, environmental conditions, etc. In some cases, a battery pack may also contain temperature sensors, voltage regulator circuits, voltage taps, and/or charge-state monitors.

Power Management Unit (PMU) 112 governs power functions of IHS 100, including AC adapter/PSU 115 and battery 116. For example, PMU 112 may be configured to: monitor power connections and battery charges, charge battery 116, control power to other components, devices, or ICs, shut down components when they are left idle, control sleep and power functions ("on" and "off"), manage interfaces for built-in keypad and touchpads, regulate real-time clocks (RTCs), etc.

In some implementations, PMU 112 may include one or more Power Management Integrated Circuits (PMICs) configured to control the flow and direction or electrical power in IHS 100. Particularly, a PMIC may be configured to perform battery management, power source selection, voltage regulation, voltage supervision, undervoltage protection, power sequencing, and/or charging operations. It may also include a DC-to-DC converter to allow dynamic voltage scaling, or the like.

Additionally, or alternatively, PMU 112 may include a Battery Management Unit (BMU) (referred to collectively as "PMU/BMU 112"). AC adapter/PSU 115 may be removably coupled to a battery charge controller within PMU/BMU 112 to provide IHS 100 with a source of DC power from battery cells within battery 116 (e.g., a lithium ion (Li-ion) or nickel metal hydride (NiMH) battery pack including one or more rechargeable batteries). PMU/BMU 112 may include non-volatile memory and it may be configured to collect and store battery status, charging, and discharging information, and to provide that information to other IHS components.

Examples of information collected and stored in a memory within PMU/BMU 112 may include, but are not limited to: operating conditions (e.g., battery operating conditions including battery state information such as battery current amplitude and/or current direction, battery voltage, battery charge cycles, battery state of charge, battery state of health, battery temperature, battery usage data such as charging and discharging data; and/or IHS operating conditions such as processor operating speed data, system power management and cooling system settings, state of "system present" pin signal), environmental or contextual information (e.g., such as ambient temperature, relative humidity, system geolocation measured by GPS or triangulation, time and date, etc.), and BMU events.

Examples of BMU events may include, but are not limited to: acceleration or shock events, system transportation events, exposure to elevated temperature for extended time periods, high discharge current rate, combinations of battery voltage, battery current and/or battery temperature (e.g., elevated temperature event at full charge and/or high voltage causes more battery degradation than lower voltage), etc.

In some embodiments, power draw measurements may be conducted with control and monitoring of power supply via PMU/BMU 112. Power draw data may also be monitored with respect to individual components or devices of IHS 100. Whenever applicable, PMU/BMU 112 may administer the execution of a power policy, or the like.

IHS 100 may also include one or more fans 117 configured to cool down one or more components or devices of IHS 100 disposed inside a chassis, case, or housing. Fan(s) 117 may include any fan inside, or attached to, IHS 100 and used for active cooling. Fan(s) 117 may be used to draw cooler air into the case from the outside, expel warm air from inside, and/or move air across a heat sink to cool a particular IHS component. In various embodiments, both axial and sometimes centrifugal (blower/squirrel-cage) fans may be used.

In other embodiments, IHS 100 may not include all the components shown in FIG. 1. In other embodiments, IHS 100 may include other components in addition to those that are shown in FIG. 1. Furthermore, some components that are represented as separate components in FIG. 1 may instead be integrated with other components, such that all or a portion of the operations executed by the illustrated components may instead be executed by the integrated component.

For example, in various embodiments described herein, host processor(s) 101 and/or other components of IHS 100 (e.g., chipset 102, display/touch controller(s) 104, communication interface(s) 105, EC/BMC 109, etc.) may be replaced by discrete devices within a heterogenous computing platform (e.g., a System-On-Chip or "SoC"). As such, IHS 100 may assume different form factors including, but not limited to: servers, workstations, desktops, laptops, appliances, video game consoles, tablets, smartphones, etc.

Split Boot Architecture

Figure 2:
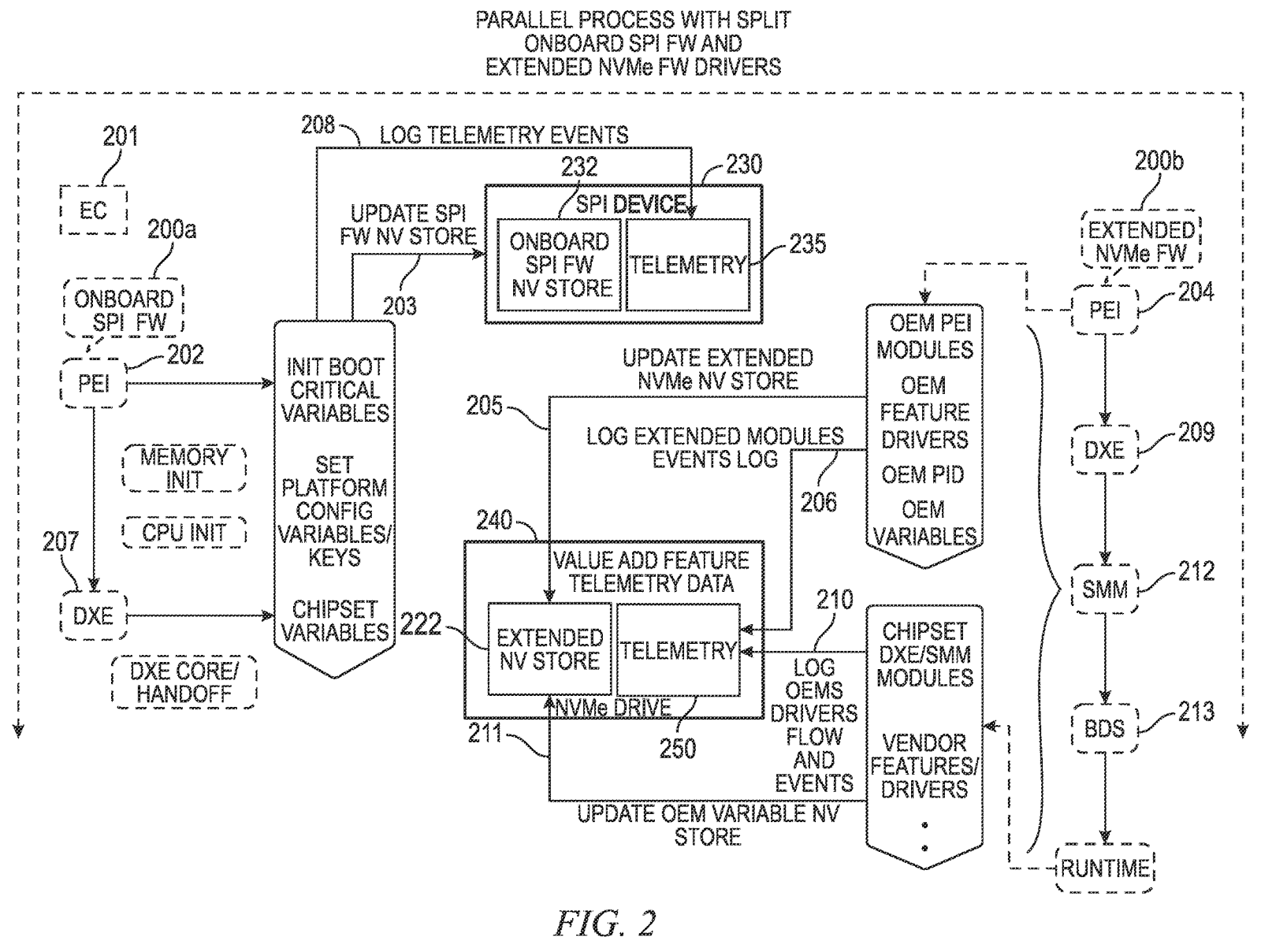

FIG. 2 is an architecture diagram illustrating an example of a split boot architecture, according to some embodiments. A split boot architecture supported hardware unit can have its Basic Input/Output System ("BIOS") code, or its Unified Extensible Firmware Interface ("UEFI") code split in two spaces. One part can be on a Serial Peripheral Interface ("SPI") chip 200a, and the other part can be in a Non-Volatile Memory Express ("NVMe") boot partition 200b, in some embodiments.

A BIOS is firmware ("FW") used to provide runtime services for operating systems and programs and to perform hardware initialization during the booting process (power-on startup). The BIOS firmware comes pre-installed on an IBM PC compatible's system board and exists in some UEFI-based systems to maintain compatibility with operating systems that do not support UEFI native operation. The BIOS in modern PCs initializes and tests the system hardware components (Power-on self-test), and loads a boot loader from a mass storage device which then initializes a kernel.

UEFI is a set of specifications written by the UEFI Forum. They define the architecture of the platform firmware used for booting, and its interface for interaction with the operating system. UEFI can replace BIOS which was present in the boot read-only memory ("ROM") of all personal computers that were IBM PC-compatible, although it can also provide backwards compatibility with the BIOS using Compatibility Support Module ("CSM") booting. To ensure backward compatibility, UEFI firmware implementations on PC-class machines could support booting in legacy BIOS mode from Master Boot Record ("MBR") partitioned disks through the CSM that provides legacy BIOS compatibility. In this scenario, booting is performed in the same way as on legacy BIOS-based systems, by ignoring the partition table and relying on the content of a boot sector. BIOS-style booting from MBR-partitioned disks is commonly called BIOS-MBR, regardless of it being performed on UEFI or legacy BIOS-based systems. Furthermore, booting legacy BIOS-based systems from a Globally Unique Identifier ("GUID") Partition Table ("GPT") disk is also possible, and such a boot scheme is commonly called BIOS-GPT.

Serial Peripheral Interface ("SPI") is a synchronous serial data protocol used by microcontrollers for communicating with one or more peripheral devices quickly over short distances. In many computer systems, a firmware image can be loaded from an SPI flash memory device. A typical computer system has firmware (aka BIOS or UEFI) stored in an SPI-based flash chip. When the power-on happens, the processor starts executing at Reset Vector which is pointing to memory-mapped SPI chip where the BIOS or UEFI is stored. From here onwards, the bootstrapping happens when the BIOS finishes initialization of the platform, loads the bootloader, which then loads the kernel.

NVM Express ("NVMe") or Non-Volatile Memory Host Controller Interface Specification ("NVMHCIS") can be an open, logical-device interface specification for accessing a computer's non-volatile storage media, usually attached via the PCI Express bus. The initials NVM stands for non-volatile memory, which is often NAND flash memory that comes in several physical form factors, including solid-state drives (SSDs), PCIe add-in cards, and/or M.2 cards, which can be known as the successor to mSATA cards. NVMe is a communications interface/protocol developed specially for Solid State Drives (SSDs). NVMe, as a logical-device interface, has been designed to capitalize on the low latency and internal parallelism of solid-state storage devices. Previously, SSDs used hard drive controller interfaces (SATA, SAS, so forth . . . ) that were designed for spinning hard disk drives. NVMe (which can based on the PCI Express data bus) can standardize the interface for SSDs, by for example, requiring only one driver for all drives using this specification.

A firmware Split boot architecture can bring various optimizations to a pre-boot environment. The split boot architecture can extend the pre-boot firmware over an external storage space like an extended NVMe space.

In a split boot architecture, the Serial Peripheral Interface ("SPI") chip 200*a* can include the core BIOS or UEFI functionality. For example, the code required to bring up a printed circuit board ("PCB"), such as for example a motherboard, that includes a CPU and chipset initialization, and memory initialization, can be on an SPI chip, in some embodiments. On the other hand, the extended NVMe 200*b* can host the original equipment manufacturer ("OEM") or 3$^{rd}$ party drivers or applications. The extended NVMe storage can host vendor specific features, OEM custom add-on features, Platform Keys, and/or Vendor Keys like a local VM keyset, for example.

The SPI side can have its own persistent storage (NV Store 232). In similar way, NVMe can also have persistent storage (Extended NV Store 222). Therefore, persistent storage can be scattered in two spaces. In addition, a BIOS-IQ service inside a BIOS can track configuration changes and be pushed to the backend.

The split boot architecture begins, in some embodiments, with the EC 201 setting up the system to execute the onboard SPI firmware 200*a*. The EC 201 might also set up the system to execute the extended NVMe FW 200*b*, in some embodiments. The onboard SPI FW 200*a* and the extended NVMe FW 200*b* can be executed in parallel in some embodiments.

The SPI firmware 200*a* can be located in an SPI device 230, such as an SPI flash memory device. The onboard SPI firmware can first be executed in the security ("SEC") phase (not shown in FIG. 2). This SEC phase can contain the CPU initialization code from a cold boot entry point on. The SEC phase's job can be to set the system up far enough to find, validate, install and run the next phase. The SEC phase might be responsible for the following: (a) Handling all platform restart events; (b) Creating a temporary memory store; (c) Serving as the root of trust in the system; and/or (d) Passing handoff information to the Pre Extensible Firmware Interface ("EFI") Initialization foundation—which is the base layer of the Pre-EFI Initialization ("PEI") phase 202 of the SPI firmware 200*a*.

The Pre-EFI Initialization ("PEI") phase 202 of the SPI FW 200*a* is invoked quite early in the boot flow. Specifically, after some preliminary processing in the Security (SEC) phase, any machine restart event will invoke the PEI phase. In a non-split boot the PEI phase 202 configures the entire platform and then loads and boots the DXE 207. However, in a split boot architecture, the PEI might also load the extended NVMe FW 200*b*, and begin execution of the NVMe FW 200*b* at its own PEI phase 204. In other embodiments, the EC 201 might have started the extended NVMe FW 200*b*, whose PEI phase 204 can be running in parallel with the PEI phase 202 of the onboard SPI FW 200*a*.

The PEI 202 of the SPI FW 200*a* can be responsible for the following, in some embodiments: (a) Initializing boot critical variables; (b) Initializing some permanent memory complement; (c) Initializing the CPU; (d) Setting platform configuration variables and/or keys; (e) Setting chipset variables; (f) Describing the memory in Hand-Off Blocks ("HOBs"); (g) Describing the firmware volume locations in HOBs; and/or (h) Passing control into the Driver Execution Environment (DXE) phase 207. In addition, the PEI phase 202 can update 203 the onboard SPI FW NV Store 232.

The PEI 204 of the extended NVMe FW 200*b* can be responsible for the following: (a) Initializing OEM PEI modules; (b) Initializing some permanent memory complement for the extended NVMe FW; (c) Initializing OEM feature drivers; (d) Setting an OEM process ID ("PID"); (c) Setting OEM variables; (f) Describing the memory in Hand-Off Blocks ("HOBs"); (g) Describing the firmware volume locations in HOBs; and/or (h) Passing control into the Driver Execution Environment (DXE) phase 209. In addition, the PEI phase 204 can update 205 the extended NVMe NV Store 222 of the NVMe drive 240. In addition, the PEI phase 204 can also log 206 an events log of the extended modules into the telemetry data 250 of the NVMe drive 240.

In some embodiments, the PEI phase 202, 204 can also be responsible for crisis recovery and resuming from the S3 sleep state. For crisis recovery, the PEI phase can reside in some small, fault-tolerant block of the firmware store. As a result, the footprint of the PEI phase can be kept as small as possible, in some embodiments. In addition, for a successful S3 resume, the speed of the resume is of utmost importance, so the code path through the firmware is minimized, in some embodiments. These two boot flows also speak to the need of keeping the processing and code paths in the PEI phase to a minimum, in some embodiments.

The PEI phase 202, 204 can also configure a system to meet the minimum prerequisites for the Driver Execution Environment ("DXE") phase. In general, the PEI phase is required to initialize a linear array of RAM large enough for the successful execution of the DXE phase elements.

The PEI phase 204 of the extended NVMe FW 200*b* also provides a framework to allow vendors to supply separate initialization modules for each functionally distinct piece of system hardware that must be initialized prior to the DXE phase of execution. The PEI phase 204 provides a common framework through which the separate initialization modules can be independently designed, developed, and updated.

The Driver execution Environment ("DXE") phase (207, 209), in some embodiments, is where the BIOS/UEFI system loads drivers for configured devices; mounts drives; and finds and executes the boot code. The Driver Execution Environment ("DXE") phase is where most of the system initialization is performed. The previous Pre-EFI Initialization ("PEI") phase (202, 204) is responsible for initializing permanent memory in the platform so that the DXE phase can be loaded and executed. The state of the system at the end of the PEI phase can be passed to the DXE phase through a list of position-independent data structures called Hand-Off Blocks ("HOBs"), in some embodiments.

There can be several components in the DXE phase: (a) DXE Foundation; (b) DXE Dispatcher; and/or (c) a set of DXE Drivers. The DXE Foundation can produce a set of Boot Services, Runtime Services, and DXE Services, in some embodiments. The DXE Dispatcher can be responsible for discovering and executing DXE drivers in the correct order, in some embodiments. The DXE drivers can be responsible for initializing the processor, chipset, and platform components as well as providing software abstractions for system services, console devices, and boot devices, in some embodiments.

These components work together to initialize the platform and provide the services required to boot an operating system. The DXE phase (207, 209) and Boot Device Selection ("BDS") phase 213 work together to establish consoles and attempt the booting of operating systems. The DXE phase (207, 209) is terminated when an operating system is successfully booted. The DXE Foundation is composed of boot services code, so no code from the DXE Foundation itself is allowed to persist into the OS runtime environment. Only the runtime data structures allocated by the DXE Foundation and services and data structured produced by runtime DXE drivers are allowed to persist into the OS runtime environment. After control is transferred to the boot OS, the "DXE Runtime" stays resident to handle any OS to UEFI calls.

In addition to some or all of the actions above, the DXE phase in a split boot environment can also be responsible for additional actions. The DXE phase 207 for the onboard SPI FW 200*a* can log telemetry events 208 into the telemetry data 235 of the SPI device 230. The DXE phase 209 for the extended NVMe FW 200*b* can be responsible for establishing chipset DXE modules and vendor features or drivers, in some embodiments. The DXE phase 209 for the extended NVMe FW 200*b* can also log 210 OEM drivers flow and events to the telemetry data 250 of the NVMe drive 240, in some embodiments. This can create value added feature telemetry data 250. The DXE phase 209 for the extended NVMe FW 200*b* can also update 211 OEM variable NV Store of the Extended NV Store 222 of the NVMe drive 240, in some embodiments.

System Management Mode ("SMM") 212 can be an operating mode in which all normal execution, including the operating system, can be suspended. An alternate software system which usually resides in the computer's firmware, or a hardware-assisted debugger, is then executed with high privileges. SMM is a special-purpose operating mode provided for handling system-wide functions like power management, system hardware control, or proprietary OEM designed code. It is intended for use only by system firmware (BIOS or UEFI), not by applications software or general-purpose systems software. The main benefit of SMM is that it offers a distinct and easily isolated processor environment that operates transparently to the operating system or executive and software applications. In order to achieve transparency, SMM imposes certain rules. The SMM can only be entered through SMI (System Management Interrupt). The processor executes the SMM code in a separate address space (SMRAM) that has to be made inaccessible to other operating modes of the CPU by the firmware. The SMM can establish SMM modules to handle specific functions.

In the boot device select ("BDS") stage 213, boot devices can be initialized, UEFI/BIOS drivers or Option ROMs of PCI devices can be executed according to system configuration, and boot options can be processed. In addition, the OS boot loader can be executed in this stage to begin to run the operating system. In the runtime stage, the BIOS/UEFI hands off to the operating system (OS). A BIOS/UEFI compatible OS is now responsible for exiting boot services, triggering the firmware to unload all no longer needed code and data, leaving only runtime services code/data, e.g. SMM and "DXE Runtime". A typical modern OS will prefer to use its own programs (such as kernel drivers) to control hardware devices. When a legacy OS is used, a CSM might handle this call ensuring the system is compatible with legacy BIOS expectation.

Problems with Split Boot Architecture

However, there are a number of problems with a split boot architecture, such as the split boot architecture depicted in FIG. 2. First, if the system fails to boot or fails its power-on self-test ("POST"), there is very little that can be done. No POST and no video can be an unwelcome sight to experience for an end user. These issues can be caused by corrupted firmware images and HW misconfigurations, in some embodiments. However, it can be hard to find a root cause if a platform has a split boot architecture, where BIOS/UEFI core code on an SPI chip and an extended feature set reside in an NVMe boot partition. Resident firmware in an SPI chip, and in an NVMe boot partition, have same UEFI/BIOS startup sequence (such as After Power ON, BIOS executes various phases starting from SEC→PEI→DXE and BDS phases). If there is any issue in resident firmware on either side it results in a NO-boot situation.

This is compounded by the fact that outside of the SPI space, images can be prone to corruption and deletion from various workflows like Data Wipe and Re-Imaging attempts. For example, a failure to boot or a POST failure can be due to recent configuration writes from the extended NVMe firmware code. As another example, a failure to boot or a POST failure can be due to a dead extended NV Store 222.

Therefore, in some embodiments of the present disclosure, the BIOS/UEFI core can come to rescue to recover the extended firmware by, for example, swapping the extended firmware with a last good known copy. This can be more specifically explained with regard to FIG. 3, below.

A second problem with a split boot architecture, such as the split boot architecture depicted in FIG. 2, is that there is no method available to manage the dependent vulnerabilities across an SPI and an extended NVMe data store. The dependency across different vendors and different mitigation methods can be complex to handle.

A third problem with a split boot architecture platform, is that there is no secure and seamless method to handle BIOS events logs from a split architecture to a non-split architecture, and vice-versa. In some embodiments of a split boot architecture, silicon dependent variables and system initialization ("SI") feature control nonvolatile data will be part of an on-board SPI chip. However, other vendor keys and OEM variables might be moved to an extended NVMe nonvolatile region. With this architecture, there is no secured communication interface for event communication between on-board SPI NV Store 232 to extended NV Store 222 regions. In addition, with split boot architectures, there is no communication layer for onboard SPI telemetry data and extended NV Store telemetry. For example, there is no seamless telemetry solution to purge method from early SI initialization modules, driver Execution modules and/or OEM provided features. Managing platform variables, vendor keys, and/or platform configuration is problematic with event logging and fallback mechanisms for split boot architectures.

A fourth problem with a split boot architecture platform, is that there is no solution available for diagnostic capability extension across SPI FW, plus extended NVMe FW, along with memory and cloud storage. In a split boot architecture, diagnostic workloads might be hosted in extended storage. However, there is no method for platform configuration restoration with telemetry event log data to deal with pre-boot firmware crashes or system hangs. No method exists to recover the BIOS events logs or system characteristics for platforms with no POST or no video, or when the extended firmware from NVMe side fails to detect or fails to initialize. There is a need to have a protocol where a diagnostic workload can be performed both for an SPI image and for value-add workloads. There is a need to label the telemetry accordingly.

A fifth problem with a split boot architecture platform, is that no method exits for pre-boot telemetry that allows a fault analyses between on-board SPI faults and extended NVMe modules. Seamless synchronization and interpretation of events across heterogeneous vendors is not available. No protocols exist for fallback mechanism and communication layer from extended BIOS/UEFI space to an onboard SPI region to handle BIOS/UEFI diagnostics and/or event logs.

A sixth problem with a split boot architecture platform is that, in pre boot diagnostics, there are no methods available to extract the pre boot system crash or system hangs from a non-split boot architecture to a split boot platforms and vice versa. With a split boot architecture, an extended feature set can reside in an NVMe drive. The BIOS core (SPI) might access the NVMe drive for extracting the telemetry and crash information. It can be important to verify the resource a BIOS/UEFI core is accessing. Without security hardening, a BIOS/UEFI core can accidentally access an un-approved device and change the platform restoration behavior, which can cause even more problems. No solution exists for platform reset characteristics and a load safe platform configuration from extended firmware and/or a restore the customer configuration based on a telemetry event. In addition, no method exists to extract telemetry data stored in extended firmware store when a dead platform and/or a recover the system log or event.

Solutions for Split Boot Architecture Problems

Figure 3A:
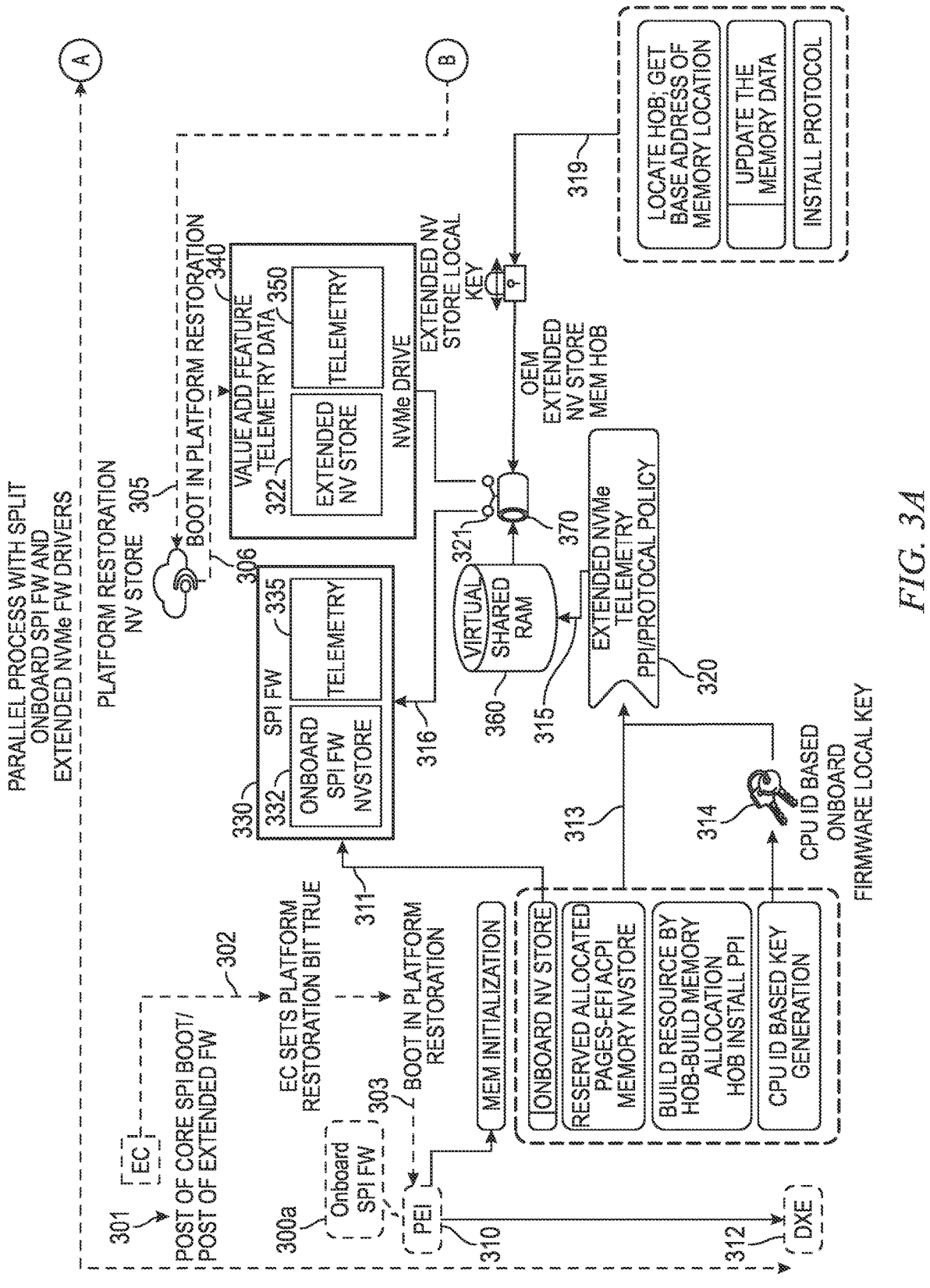
FIGS. 3A and 3B is an architecture diagram illustrating an example of diagnostics and remediation for a split-boot architecture system, according to some embodiments.
Figure 3B:
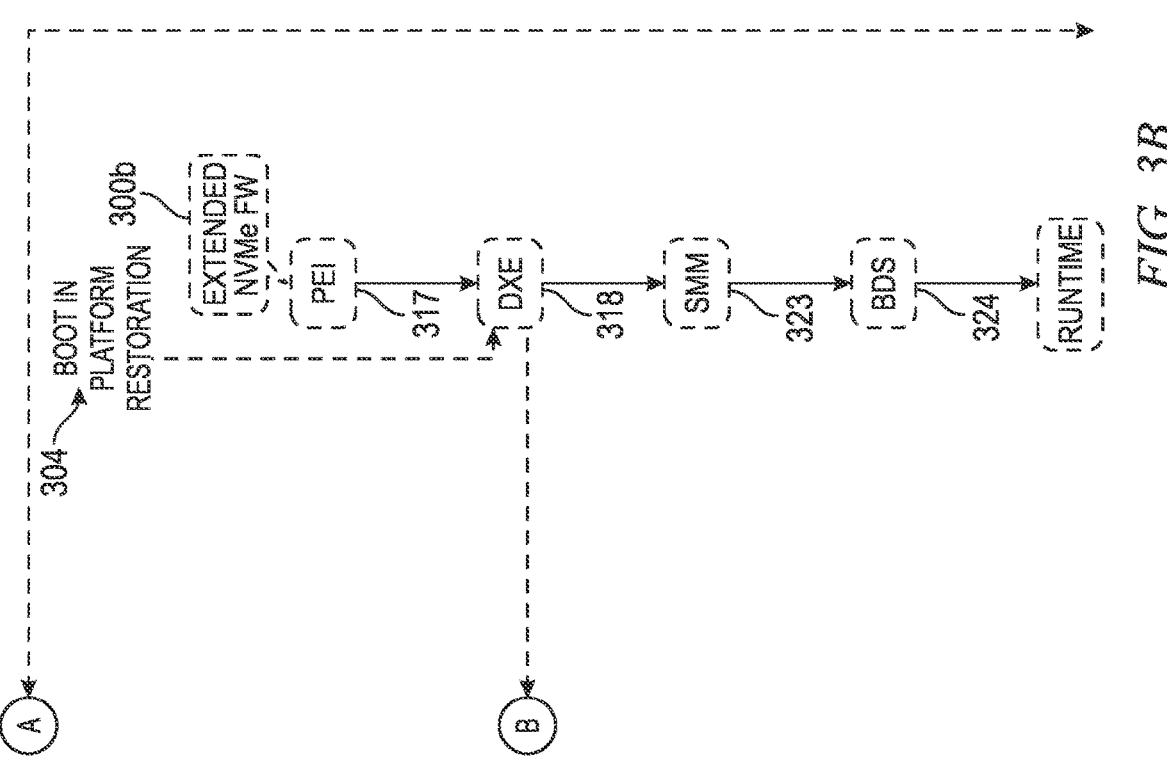

FIGS. 3A and 3B together are an architecture diagram illustrating an example of diagnostics and remediation for a split-boot architecture system, according to some embodiments. FIGS. 3A and 3B depict at least some solutions to at least some of the above problems of split boot architectures, according to some embodiments.

Some of the embodiments provide seamless synchronization and interpretation of events across heterogeneous vendors (e.g., Intel/AMD/QCM). Some of these embodiments provide unification of these events so that any failover methods will be successful. Since, outside of the SPI space, data is prone to corruption and deletion from various sources or workflows like Data Wipe and Re-Imaging attempts, some embodiments provide for the BIOS/UEFI core to recover the extended firmware by top swapping with a last good known copy.

Since a split boot architecture extends the firmware space, some embodiments provide secure error handling and a secure communication layer and protocols between the onboard SPI chip and the extend firmware volumes of the NVMe. These embodiments can therefore provide security for BIOS diagnostics and pre boot event handling. Some embodiments implement the secured communication layer and protocol to provide for a seamless pre boot event handling, and a fallback mechanism for NVMe other boot blocks (Vendor Specific features) and onboard critical boot blocks (SI Initialization, etc.). Some embodiments can provide for the use of user context based on several configurations (e.g., including OS stack before 2 weeks), the use of context of a Best Known Configuration ("BKC") when the last firmware update happened, and/or the context of memory and storage, etc. In some embodiments, telemetry can come from SPI modules (SI Initialization, etc.), as well as from off the SPI modules like vendor specific feature sets. In some embodiments, platform configuration can be saved, and this action can be recorded as a telemetry event. In some embodiments, this information can be used when SPI recovery happens. In some of these embodiments, a new SPI Image contacts extended storage to retrieve the platform configuration.

Some embodiments of the present disclosure provide for a Telemetry Driven ML Algorithm for platform restoration. Some of these embodiments track boot stage failure on both resident firmware sets, for example SPI firmware and NVMe firmware. In some of these embodiments, both SPI and NVMe have persistent storage space for telemetry (335, 350). When the system boots, the BIOS/UEFI code can log the telemetry in respective spaces (335, 350), in some embodiments. If the extended firmware set 300b is down due to misconfiguration, then the core BIOS/UEFI code can extract the telemetry 350 from the extended NVMe store 322, in some embodiments. In addition, it can analyze which stage has failed, and what were the different configuration changes that were undergone in the previous boot cycles. The BIOS/UEFI core (e.g., SPI 300a) can revert the firmware of the extended NVMe drive 340 to a last good known configuration. This configuration can be a factory default copy or a previous configuration copy that is captured when the system had a previous successful boot.

For example, referring to FIG. 3, the embedded controller performs a POST 301 of the core SPI boot partition (e.g., in the onboard SPI FW 300a) as well as a POST 301 of the extended firmware (e.g., in the extended NVMe FW 300b). The EC can then set the platform restoration bit to true 302. Setting the platform restoration bit to true 302 causes the onboard SPI FW to boot in platform restoration mode 303, as well as the extended NVMe firmware to boot in platform restoration mode 304. When the extended NVMe FW 300b boots in platform restoration mode 304, the DXE component 318 can cause a platform restoration from a cloud service 305, and revert 306 the extended NVMe drive 340 to a last good known configuration. This configuration can be a factory default copy or a previous configuration copy that is captured when the system had a previous successful boot.

Some embodiments also can implement a pre boot algorithm to detect system boot failure events using telemetry data from onboard and extended firmware. When these embodiments detect a failure from either onboard SPI FW 300a or extended FW 300b, then they can extract and load a default/well known factory platform configuration from a cloud service 305. They can do this by initializing the minimal firmware network stack, in some embodiments. Some embodiments may also implement different fallback methods for restoring the configuration with different configuration version blocks. For example, some embodiments might store the different configuration versions like the factory default configuration, the last successful boot configuration, or the last well known system configuration.

Some embodiments might implement a telemetry driven machine learning ("ML") based algorithm to extract telemetry data after a pre boot system crash or a system hangs. The ML based algorithm can determine platform reset characteristics, and load a safe platform configuration from either extended firmware or from a cloud service over a network, in some embodiments. The ML based algorithm can therefore restore the customer configuration based on telemetry, in some embodiments.

Some embodiments can implement a method to store the split boot configuration to a cloud service, and then extract the system or customer configuration when there is a pre boot failure caused by either the onboard BIOS/UEFI FW or the extended FW store. Some of these embodiments might employ a split mechanism which is split over a network or a cloud service, from which to get platform configuration and restore it back. Some of these embodiments provide context specific platform restoration from a cloud ecosystem with smart ML aware telemetry events. Some embodiments provide for hybrid persistency of platform boot events with cloud memory pools. Some embodiments provide a Sliding Memory Frame Protocol ("SFP") to restore context, with Floating Handlers that locate and load platform context from a scattered NV Store.

Some embodiments of the present disclosure provide for a Secured Communication Protocol for an Onboard and an Extended Firmware Store. These embodiments can implement a protocol for a safe and trusted layer and/or secured method to handle BIOS/UEFI events logs from a split boot architecture to a non-split boot architecture and vice-versa. Some of these embodiments can implement a secured method to handle BIOS/UEFI IQ with telemetry data for a spilt architecture.

The PEI 310 of the SPI FW 300a can be responsible for initializing some permanent memory complement, and updating 311 the onboard SPI FW NV Store 332. It can then reserve or allocate pages using an extensible firmware interface ("EFI") and/or Advanced Configuration and Power Interface ("ACPI") in memory and/or the NV Store. It can also build resources by HOBs, build memory allocation HOBs, and/or install a Parallel Peripheral Interface ("PPI").

The SPI FW can then provide 313 these reserved or allocated pages and/or HOBs to a virtual shared RAM via an extended NVMe telemetry PPI/protocol policy. The extended NVMe telemetry PPI/protocol policy 320 can determine whether and how to store these pages and/or HOBs in virtual shared RAM 360. The policy can perform one or more of the following, in some embodiments: (a) verify SI handoff; (b) retrieve onboard SPI FW NV store 332 event data; (c) retrieve extended NVMe NV store 322 event data; (d) reserve RAM memory for the NV Store; (e) build memory HOBs; (f) install a PPI; (g) handle HOBs; (h) get base addresses; (i) update memory data; and/or (j) install a protocol.

Some embodiments can implement such a protocol for a safe and trusted and/or secured communication layer to handle seamless pre boot event handling and fallback mechanisms for NVMe Other Boot blocks and/or Onboard Critical boot blocks. The embodiments can implement services to read write the event log in PEI/DXE phases and/or runtime. When a BIOS core (e.g., SPI) encounters no bootable devices found, it then can follow the diagnostics/troubleshooting steps described below, in some embodiments.

An NVMe drive can have its own firmware in a split boot architecture. Therefore, a BIOS/UEFI core resident diagnostic code can send a "Self-Test" command to the NVMe firmware to check the health status of the drive. If a response to the command is NULL or no output, then some embodiments can conclude that the NVMe firmware is not responding. Some of these embodiments can then flash the BIOS/UEFI core, and/or re-flash the NVMe firmware with last good known image. If a response to the command came as bad sectors, then in some embodiments, the BIOS/UEFI code can record the errors and return error information to an OEM back-end server. The OEM back-end server can run auto-dispatch use cases in order to ship a new drive to the customer, for example. If a response to the command is good, then some embodiments can perform a RESET to the NVMe firmware, and/or try to re-scan the drive by re-enumerating the UEFI NVMe driver. Therefore, some embodiments provides a zero-touch method to auto-heal the NVMe drive when the BIOS/UEFI encounters a no-bootable devices found issue.

Some embodiments of the present disclosure provide for a Runtime Shared RAM Disk memory space 360 for Seamless Telemetry Event logging. Some of these embodiments create a virtual RAM disk or common memory space 360 for SI initialization, core boot and/or OEM features event logging. Some of these embodiments implement a mechanism for common telemetry events from a silicon initialization and/or core boot initialization. Some of these embodiments implement a mechanism for common telemetry events from a core feature and/or Database Partitioning Feature ("DPF"). Some embodiments implement services to access, read, and/or write RAM disk space. Some embodiments create a reserved memory space with a specific (e.g., Efi-ACPIMemoryNVS) type.

Referring to FIG. 3, the extended NVMe telemetry PPI/protocol policy can provide SI initialization, core boot and/or OEM features event logging to the virtual shared RAM 360. The virtual shared RAM 360 provides data to the OEM extended NV store memory HOB 321. In addition, a DXE 318 or SMM 323 phase of the extended NVMe FW 300b can locate HOBs, get base addresses of memory locations, and/or update the memory data of an OEM extended NV store memory HOB 321. The OEM extended NV store memory HOBs can provide telemetry event logging to the telemetry data store 335 of the SPI FW 330 and/or the telemetry data store 350 of the NVMe drive 340. The telemetry data store 350 of the NVMe drive 340 can include value added feature telemetry data.

Some embodiments of the present disclosure provide for a Key based authentication and extraction of an Event log from a Dead Platform. In some embodiments, the BIOS/UEFI core includes one or more cryptographic keys. These cryptographic keys can be used to verify the signature of content that is being extracted from an extended feature set (e.g., in the NVMe drive 340). The BIOS/UEFI core can include a drive attestation signature that resides inside the BIOS/UEFI core protected space. The BIOS/UEFI core can read attributes of the NVMe drive, like the electronic Piece Part Identification ("ePPID"), and can validate whether or not this drive belongs to this machine.

Some embodiments can also implement a pre boot firmware build time and runtime platform Key event method, in order to add a platform specific Key based on the CPU ID. Some embodiments can also implement a build time and/or runtime solution to generate a secure key for an event log extraction from a dead platform using the secured key. For example, the PEI 310 or the DXE 312 of the onboard SPI FW 300a can generate a CPU ID based onboard firmware local key 314. Such a key can then be used by the extended NVMe telemetry PPI/protocol policy 320. As another example, the PEI 317, DXE 318, or SMM 323 of the extended NVMe FW 300b can generate an extended NV store local key 319. The key can be used to sign content of the extended feature set in the NVMe drive 340.

Some embodiments can also bring up a thin network stack with universal network driver interface ("UNDI") and/or Simple Network Protocol ("SNP") protocols, in order to connect with a remote server and to share the platform event log over a telemetry server. Some embodiments can secure an NVMe drive swap from one platform to another platform. Some embodiments can also protect telemetry from offline unexpected extracting.

Figure 4:
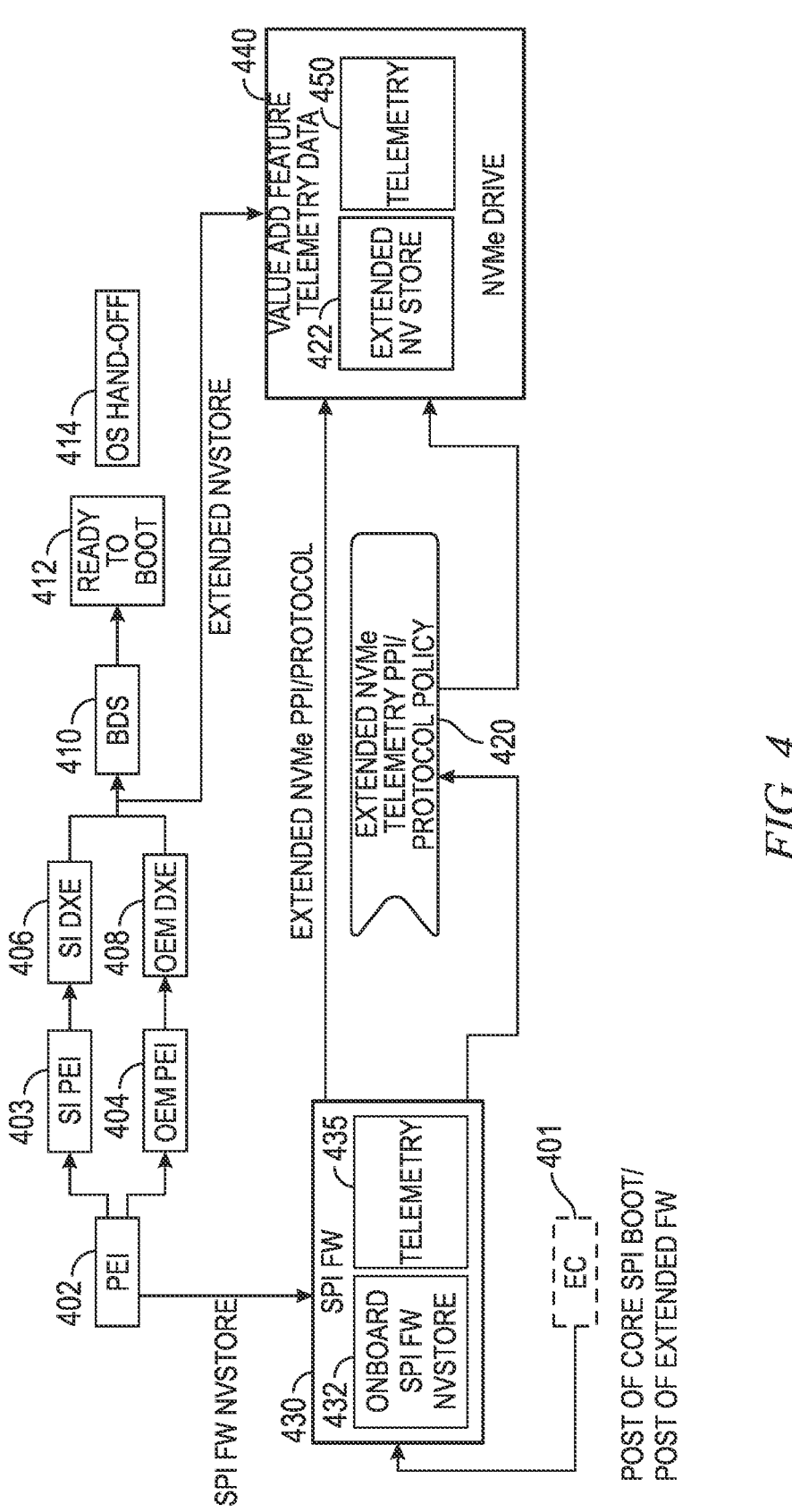
FIG. 4 is a workflow architecture diagram illustrating a method for diagnostics and remediation for a split-boot architecture system, according to some embodiments.

FIG. 4 is a workflow architecture diagram illustrating a method for diagnostics and remediation for a split-boot architecture system, according to some embodiments. FIG. 4 begins with the embedded controller 401 performing a POST of the core SPI boot partition (e.g., in the onboard SPI FW 430) as well as a POST 301 of the extended firmware (e.g., in the extended NVMe drive 440). The PEI 402 commences operation which updates the onboard SPI FW NV Store 432 and the telemetry data store 435. The PEI 402 transitions to an SI PEI 403 and an OEM PEI 404 which operate in parallel. The PEI stage transitions to the SI DXE 406 and OEM DXE 408 which can also operate in parallel. The DXE stage(s) (406 and/or 408) can update the extended NV Store 422 and provide value added feature telemetry data to the telemetry data store 450 of the NVMe drive 440. The DXE stages (406, 408) transition to the BDS stage 410 which transition to the ready to boot stage 412, which then performs an OS hand-off 414.

The SPI FW 430 and NVMe drive 440 can communicate using an extended NVMe PPI/protocol that operates using an extended NVMe telemetry PPI/protocol policy 420. The extended NVMe telemetry PPI/protocol policy 420 can perform one or more of the following, in some embodiments: (a) verify SI handoff; (b) retrieve onboard SPI FW NV store 332 event data; (c) retrieve extended NVMe NV store 322 event data; (d) reserve RAM memory for the NV Store; (c) build memory HOBs; (f) install a PPI; (g) handle HOBs; (h) get base addresses; (i) update memory data; and/or (j) install a protocol.

To implement various operations described herein, computer program code (i.e., program instructions for carrying out these operations) may be written in any combination of one or more programming languages, including an object-oriented programming language such as Java, Smalltalk, Python, C++, or the like, conventional procedural programming languages, such as the "C" programming language or similar programming languages, or any of machine learning software. These program instructions may also be stored in a computer readable storage medium that can direct a computer system, other programmable data processing apparatus, controller, or other device to operate in a particular manner, such that the instructions stored in the computer readable medium produce an article of manufacture including instructions which implement the operations specified in the block diagram block or blocks.

Program instructions may also be loaded onto a computer, other programmable data processing apparatus, controller, or other device to cause a series of operations to be performed on the computer, or other programmable apparatus or devices, to produce a computer implemented process such that the instructions upon execution provide processes for implementing the operations specified in the block diagram block or blocks.

Modules implemented in software for execution by various types of processors may, for instance, include one or more physical or logical blocks of computer instructions, which may, for instance, be organized as an object or procedure. Nevertheless, the executables of an identified module need not be physically located together but may include disparate instructions stored in different locations which, when joined logically together, include the module and achieve the stated purpose for the module. Indeed, a module of executable code may be a single instruction, or many instructions, and may even be distributed over several different code segments, among different programs, and across several memory devices.

Similarly, operational data may be identified and illustrated herein within modules and may be embodied in any suitable form and organized within any suitable type of data structure. Operational data may be collected as a single data set or may be distributed over different locations including over different storage devices.

Reference is made herein to "configuring" a device or a device "configured to" perform some operation(s). This may include selecting predefined logic blocks and logically associating them. It may also include programming computer software-based logic of a retrofit control device, wiring discrete hardware components, or a combination of thereof. Such configured devices are physically designed to perform the specified operation(s).

Various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs.

As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

The invention claimed is:

1. An Information Handling System (IHS), comprising:
   a printed circuit board;
   a processor coupled to the printed circuit board; and
   a memory coupled to the processor, wherein the memory comprises program instructions stored thereon that, upon execution by the processor, cause the IHS to:
   send, in a split boot architecture, one or more commands from executed firmware onboard the printed circuit board to executed extended firmware via a communication protocol, wherein the extended firmware resides on a Non-Volatile Memory Express ("NVMe") component; and based, at least in part, on a response or a lack of response from the executed extended firmware to the one or more commands, perform one or more responsive actions, wherein the one or more responsive actions comprise:

perform a reset of the extended firmware when the response from the extended firmware indicates normal operation; and re-scan the component comprising the extended firmware when the response from the extended firmware indicates normal operation;

wherein the split boot architecture comprises boot firmware code split into the firmware onboard the printed circuit board and the extended firmware.

2. The IHS of claim 1, wherein the firmware onboard the printed circuit board resides on a Serial Peripheral Interface ("SPI") component.

3. The IHS of claim 1, wherein the one or more commands comprise a self-test command from the firmware onboard the printed circuit board to the extended firmware.

4. The IHS of claim 3, wherein the self-test command instructs the extended firmware to check a health status of the NVMe component comprising the extended firmware.

5. The IHS of claim 1, wherein to perform the one or more responsive actions, the program instructions, upon execution by the processor, further cause the IHS to:

revert the extended firmware to a last good known configuration.

6. The IHS of claim 5, wherein the last good known configuration comprises one or more of: a factory default configuration, or a previous configuration that was captured when the IHS had a successful boot.

7. The IHS of claim 5, wherein the last good known configuration is obtained from a cloud service via a network.

8. The IHS of claim 1, wherein the one or more commands are sent by the firmware onboard the printed circuit board in response to a determination that no bootable devices are found.

9. The IHS of claim 1, wherein the program instructions, upon execution by the processor, further cause the IHS to:

log information into a common memory space shared between the firmware onboard the printed circuit board and the extended firmware.

10. The IHS of claim 1, wherein the communication protocol is for communication between the firmware onboard the printed circuit board and the extended firmware.

11. A method, comprising:

sending, in a split boot architecture, one or more commands from executing firmware onboard a printed circuit board to executing extended firmware, wherein the extended firmware resides on a Non-Volatile Memory Express ("NVMe") component;

detecting a response from the extended firmware to the one or more commands; and based, at least in part, on the response from the extended firmware to the one or more commands, performing one or more responsive actions, wherein the performing of the one or more responsive actions further comprises performing:

detecting the response from the extended firmware indicating normal operation;

performing a reset of the extended firmware in response to the detecting of the response from the extended firmware indicating normal operation; and re-scanning the component comprising the extended firmware in response to the detecting of the response from the extended firmware indicating normal operation;

wherein the split boot architecture comprises boot firmware code split into the firmware onboard the printed circuit board and the extended firmware.

12. The method of claim 11, wherein sending the one or more commands from the executing firmware onboard the printed circuit board to the executing extended firmware further comprises:

sending a self-test command to the executing extended firmware.

13. The method of claim 11, further comprising:

logging information into a common memory space shared between the firmware onboard the printed circuit board and the extended firmware.

* * * * *